Dec. 10, 1957  E. W. GOLDBERG  2,815,813
EDITING HOLDER FOR VIEWING AND CUTTING STRIP FILM
Filed Oct. 24, 1951  2 Sheets-Sheet 1
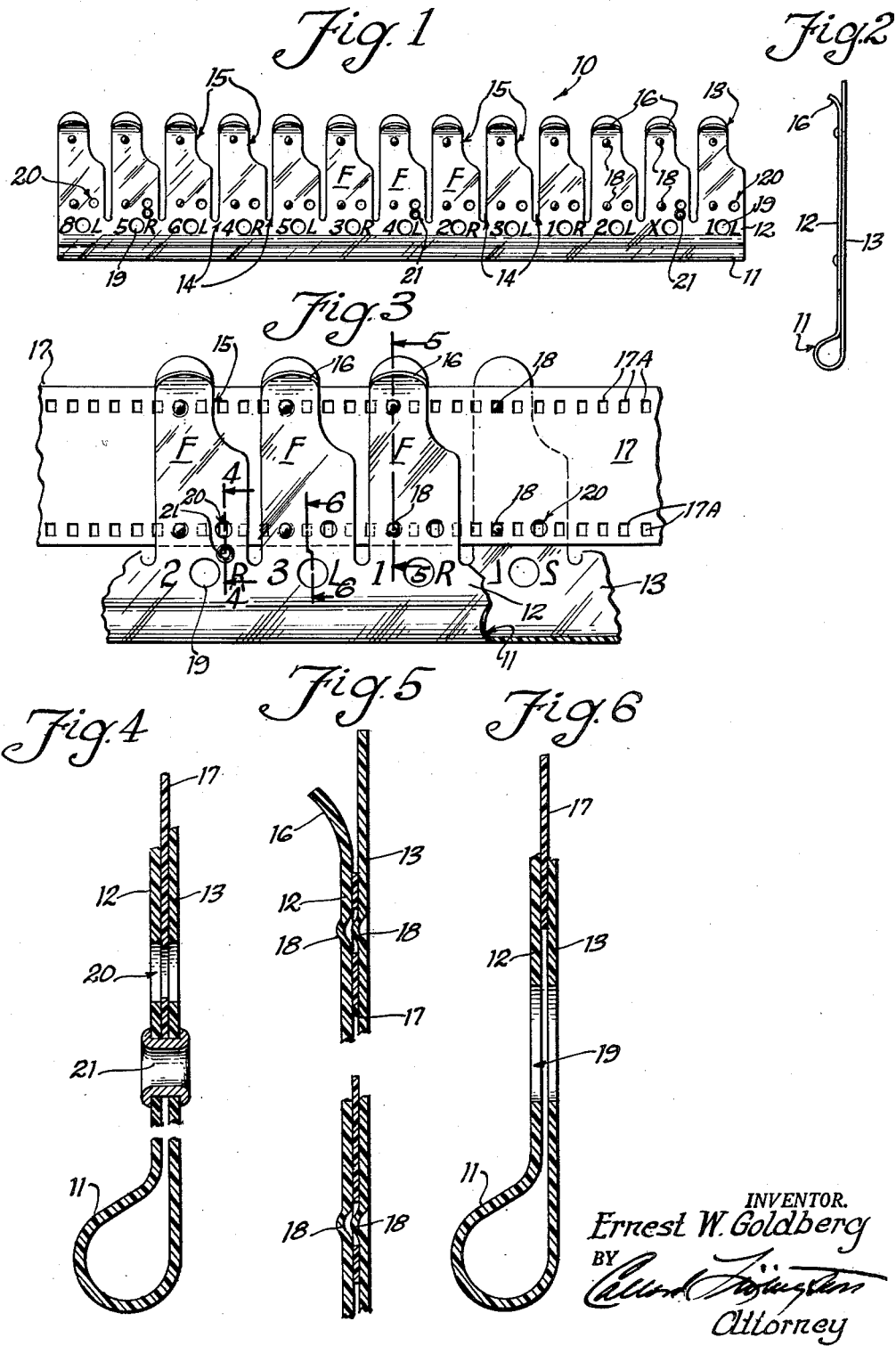
INVENTOR.
Ernest W. Goldberg
BY
Attorney Dec. 10, 1957 E. W. GOLDBERG 2,815,813
EDITING HOLDER FOR VIEWING AND CUTTING STRIP FILM
Filed Oct. 24, 1951 2 Sheets-Sheet 2

INVENTOR.
Ernest W. Goldberg
BY
Attorney

United States Patent Office 2,815,813
Patented Dec. 10, 1957

2,815,813
EDITING HOLDER FOR VIEWING AND CUTTING STRIP FILM

Ernest W. Goldberg, Wilmette, Ill., assignor, by mesne assignments, to Minneapolis-Honeywell Regulator Company, a corporation of Delaware Application October 24, 1951, Serial No. 252,925

5 Claims. (Cl. 164—79)

This invention pertains to photographic equipment and particularly to devices for holding strip film for purposes of inspection, cutting, and like operations.

A specific object of the invention is the provision of a strip-film editing device which will hold a length of film in extended condition and which includes transparent portions through which the pictures disposed along the length of the film may be examined by transmitted light.

Another object is the provision of an elongated film-editing holder having a series of film-gripping members separated by cutting slots which enable individual pictures or sections of the film to be cut, the cut portions being retained in their original positions after severance.

Another object is the provision of transparent holder for lengths of strip film which includes stereoscopic exposures thereon, the holder having a series of transparent, separately flexible film-grasping sections spaced apart by transverse severance slots by means of which the various stereoscopic pairs may be examined, and selectively cut and matched, but will nevertheless be removably held in their proper relative positions after cutting, whereby mismatching or misplacement, or similar confusions of the component pictures of the stereoscopic pairs will be avoided, said pairs being selectively removable from the holder for purposes of mounting in binders or holders, or exhibition.

A further object is the provision of an editing strip adapted to cooperate with film-cutting mechanism and having locating means for registering the film in the holder with the spear means of the cutter mechanism.

A further object is the provision of a cutting guide and holder for stereoscopic strip film and having individual frame-holding means with guide indicia numbered in a predetermined manner to designate the transposition order of cut stereoscopic pairs for mounting, binding or viewing purposes.

Additional objects and aspects of novelty and utility relate to the details of construction and operation of the illustrative embodiment of the holder described hereinafter in view of the annexed drawings in which:

Fig. 1 is a front elevational view of the novel editing strip, or holder;

Fig. 2 is an endwise view of the holder;

Fig. 3 is an enlarged elevational fragment of the holder with a section of strip film shown in operative position therein;

Figure 7:
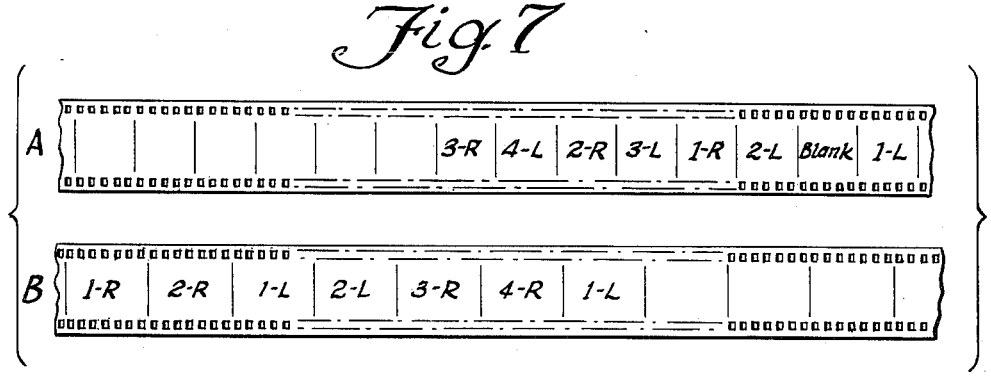
Figure 8:
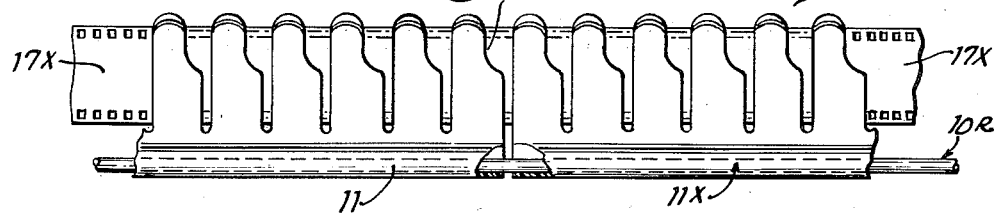
Figure 9:
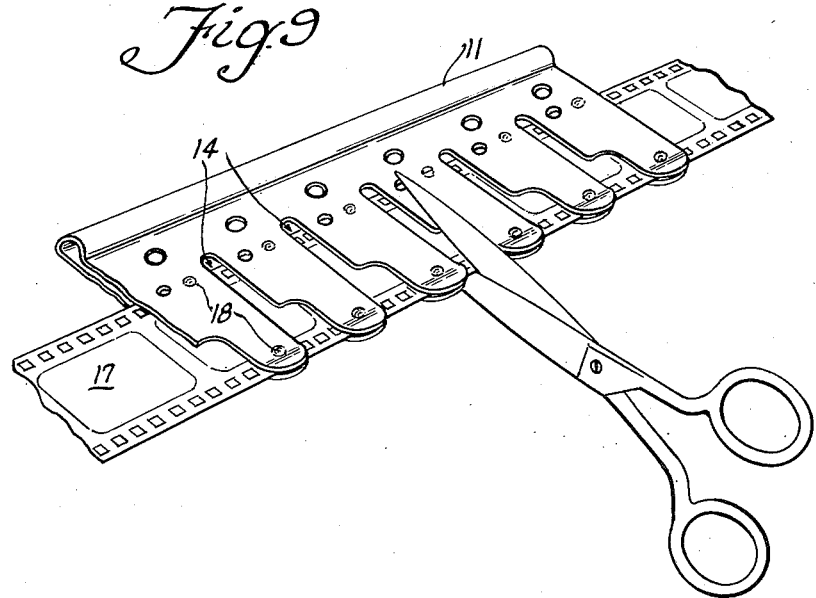

Figs. 4, 5, and 6 are vertical sectional details respectively taken along lines 4—4, 5—5, and 6—6 of Fig. 3;

Fig. 7 is a plan view of a section of strip film illustrating the pairing of stereoscopic views for editing and cutting purposes;

Fig. 8 is an elevational view of portions of two sections of the editing strip joined to receive a longer length of film;

Fig. 9 is an enlarged perspective detail of the holder illustrative of the cutting of film.

Referring to Fig. 1, the novel film editing and cutting strip is generally indicated at 10, and consists of an elongated panel of thin, transparent and semi-rigid plastic material (e. g. Vinylite) folded back upon itself about a tubular bottom margin 11, so as to provide integrally-joined front and rear panel sections or walls 12 and 13, as in Fig. 2.

The two transparent front and rear wall sections 12 and 13 are yieldingly urged or pressed closely together by reason of a spring action in the bottom tubular juncture 11, so that the said walls or panels will grasp a strip of film therebetween.

At equally spaced intervals along the length of the folded holder strip are serially situated transverse cutting slots 14 each widened as at 15 at the entrance portion thereof in the free or open-edge margins of the strip.

The said cutting slots 14 thus define a series of pairs of flat, transparent, grasping tabs or fingers F, each consisting of one front and one rear portion of the folded plastic panel pieces 12 and 13.

The upper free ends of each of the front tab or finger portions are cut down and offset outwardly to provide lead-in lips 16, as shown especially in Figs. 2 and 5.

A length 17 of the type of strip film used in the holder, is shown in position in Fig. 3, said film having marginal sprocket punches 17A which are engageable with upper and lower pairs of interfitting locating bosses 18 situated on each pair of fingers F (see also Fig. 5). These locating bosses serve to maintain the entire length of film in a desired position in the holder, and in addition will hold individual pictures or frames, as they are commonly called, in position after cutting.

A series of jig-register holes 19 is extended along the length of the holder, just above the junctural or tubular margin 11, for the purpose of accurately locating the holder and the several pictures or frames of the strip film in a known type of cutting jig (not shown) which is adapted to hold the film strip in cutting positions relative to a cutter.

Another series of smaller jig-pin holes 20 is extended along the length of the holder above the level of the larger holes 19, for cooperation with a cutting jig, as aforesaid.

At intervals eyelets 21 secure the front and rear panels or sheet portions for further rigidification which is especially desirable where the thinner grades of plastic stock are used.

The editing strip disclosed is useful in conjunction with strip-film, in general, and is especially adapted to the editing of 35 mm. stereo, motion-picture, or still picture strips.

Commonly, it is desired to inspect a strip of newly developed film and selected certain pictures because of their interest or significance or photographic qualities, and this is especially true of stereoscopic views.

By placing an entire strip of film in the editing holder, the several frames or exposures may be inspected under ordinary light, since the holder is fully transparent.

It will be understood that stereoscopic photography utilizing dual exposures results in pairs of pictures differing only slightly in the relative or apparent viewpoint; and a strip of film bearing stereoscopically photographed views will include a pair of complementary pictures or views for each exposure; but these pairs of views are inverted and transposed from right to left by the camera, and the numbering thereof is interrupted, by which is meant that instead of the views of each pair appearing together in immediate succession, there will be irrelevant exposures occurring between the two mating exposures of each stereoscopic pair.

This is illustrated in Fig. 7 wherein the views numbered 1R—1L, 2R—2L, 3R—3L, etc. respectively constitute the mating or complementary views of each stereoscopic exposure, and must therefore be cut from the film and brought into association by some means, such as a binder or slide holder, or the like, for proper stereoscopic projection or viewing.

It will be understood that considerable loss of time and confusion can arise in cutting individual scenes from a length of film containing substantial duplications of identical scenes. Frequently the same scene may be photographed stereoscopically several times on the same strip of film at only slightly different exposure values, and it is extremely difficult to distinguish single views to identify which pair they belong to once they have been cut from the film and intermingled.

After the exposures are made and developed, the pairs of views are obviously in proper fixed positions on the film prior to cutting; however, once the cuts are made there is great danger of confusing the proper relative "right" and "left" order of the individual views of the pair or views from similar or nearly identical exposures forming a series of shots of the same view; and accidental transposition of right and left exposures can cause a good deal of trouble, especially if the views become sealed in a binding frame.

It is therefore very important that the original right and left relationships of the views of any pair be accurately known when mounting said views for projection, as commonly the stereoscopic effect will be destroyed or annoying optical confusions will arise from improper matching.

Accordingly, the novel holder has the film grasping tabs or fingers F marked appropriately with indicia (Fig. 1) 1L, X, 2L, 1R, 3L, 2R, 4L, 3R, . . . 5R, 8L, etc., corresponding to the placement of views by pairs on the original or uncut film. This indicia means "Nos. 1 left, blank, 2 left, 1 right," etc.

Thus, after the desired views have been cut (Fig. 9) the views of the pairs may be removed one at a time from the holder and transferred to their proper positions in a binder (not shown) or the like.

The numbering schemes currently employed in connection with various types or makes of stereoscopic camera are not always alike. For instance, in Fig. 7A there is illustrated the so-called 5-sprocket frame which simply means there are five sprocket punches per frame or view. Commonly, the frame immediately following the first frame, numbered 1L is a blank, and this is indicated on the holder of Fig. 1 by the indicium "X."

But in Fig. 7B the so-called 7-sprocket frame is shown, and in one commercial form of camera no blanks appear, so that the numbering scheme of the indicia on the editing strip or holder adapted to receive this form of film would appear as in Fig. 7B.

It will be understood therefore that the editing strip may be numbered, as to frame-identifying indicia, and adapted as to spacing of sprocket-locating bosses 18, to receive and hold films of various size, including also the 4-sprocket frames commonly associated with monoscopic stills.

The novel editing strip or holder completely solves the problem of selectively identifying and cutting confusingly similar views from a strip of film; it enables an easy viewing of the individual scenes, cutting of desired frames from the strip of film, and affords a means for holding the cut frames in their proper relatively position pending removal at the convenience of the operator for binding or other purposes.

The cutting operation is facilitated and rendered accurate by reason of the location and accurate spacing of the guide slots 14, which are wide enough to admit a shearing blade or an ordinary pair of scissors, as suggested in Fig. 9.

Another feature of the device is its adaptability for extended lengths of strip film, as illustrated in Fig. 8, wherein two (or more) editing strips 10 and 10X are operatively joined by means of a rod 10R slid into the aligned bores of the tubular portions 11, 11X of the several holders, and one continuous length of film 17X is seated in the aligned holders.

Changes in the specifically described details of the illustrative embodiment are possible and contemplated within the scope of the invention as defined by the appended claims.

I claim:

1. A holder for viewing and cutting strip film and comprising an elongated sheet of transparent material of the class of Vinylite plastics, turned back upon itself along a longitudinal axis to provide a pair of confronting elongated transparent panels urged together to seize a strip of film therebetween, said holder having a series of lateral slits arranged along its length and each extending a distance at least fully equal to the width of said film to admit a cutting tool by means of which sections of the film may be completely severed.

2. A film-viewing holder comprising an elongated structure consisting of two panels of transparent material which are unattached and free along one longitudinal edge but are joined along the opposite longitudinal edges to lie in closely juxtaposed relation to define an elongated film-receiving pocket, said panels having registered slots formed crosswise thereof to a depth slightly greater than the width of film to be held to define a series of adajcent pairs of film-grasping fingers, said panel material being resilient and at least one of the fingers of each pair having a boss portion projecting generally toward the other finger of the pair and located to enter into an edgewise sprocket punch in the film, the fingers of each pair being adapted to yield apart for withdrawal of the boss portion from a sprocket punch responsive to withdrawal of the film therefrom.

3. An editing holder for viewing and cutting strip film of the type having sprocket punches spaced along the longitudinal edges thereof, said holder comprising a pair of elongated, thin panels of semi-flexible transparent material, said panels respectively being of a length and width to contain a strip of said film therebetween, said panels respectively constituting front and back walls of the holder and being juxtaposed and joined together along one longitudinal margin and yieldingly biased toward each other into close contiguity sufficient to grasp said strip of film therebetween, said panels including a series of lateral cutter slots therethrough and spaced therealong at predetermined intervals, said slots extending through the unattached longitudinal edges of the panels a distance greater than the width of said strip film and dividing said panels into a plurality of pairs of relatively separable grasp fingers, each said pair of fingers consisting of a portion of the front wall panel and a portion of the back wall panel; at least one finger of each said pair having a film-locator member thereon adapted to project into a sprocket punch of said strip of film therebeneath, said slots being adapted to admit a film-cutting tool, said fingers retentively grasping individual cut sections of the film, and said film-locator members being operative to locate and further maintain in position the entire strip of held film, as well as any cut sections thereof, pending removal from the holder.

4. An editing device for holding lengths of stereoscopically exposed film having sprocket holes, said device comprising a pair of superposed, elongated plates of transparent, semi-flexible material joined along one longitudinal edge portion to receive through the opposite free longitudinal edges of the plates a strip of said film, said plates having a series of narrow aligned lateral slots therein to admit a cutting tool for shearing exposed frames from said film, said slots being successively spaced apart the distance of one said frame and dividing the intervening pairs of superposed plate portions into a series of pairs of fingers, each said pair of fingers overlying one of the frames in the film strip, at least one finger of each said pair having a protrusion to engage in a sprocket punch in a film frame aligned therewith, and indicia means aligned with each pair of said fingers for correlating and identifying the contained film frame appertaining thereto, with a companion stereoscopic frame of the same strip contained in another pair of said fingers and identified by correlated indicia, whereby said film strip may be inspected by transmitted light through said fingers, and desired frames may be cut and removed for matching according to said indicia.

5. An editing and cutting holder for lengths of strip-film transparencies of the type having a marginal series of sprocket punches, said holder comprising, to wit: an elongated strip of stiff but yieldable transparent material folded over upon itself along a median lengthwise line whereby to define a thin, flat, elongated, transparent holder for a strip of said film, said holder being open along one longitudinal edge and across both lateral ends and having a succession of evenly spaced laterally extending scissor-slots separating the holder into a succession of picture pockets, said scissor-slots extending from said open longitudinal edge toward the opposite longitudinal edge but terminating short of the latter, said scissor-slots being longer than the width of the strip film intended to be received in said holder, each of said slots being wider at its entrance near said open longitudinal edge than at the remaining inwardly-extending portions thereof to provide an enlarged cut-away area for each scissor slot to admit the fingers for grasping cut pieces of film in an appertaining pocket, and detent means on said holder material at each pocket for engaging in the sprocket punch of a piece of said film therein to releasably hold the same therein.

References Cited in the file of this patent

UNITED STATES PATENTS

| | | |
|---|---|---|
| 46,099 | Foulley | Jan. 31, 1865 |
| 90,055 | Shoemaker | May 11, 1869 |
| 476,481 | Newcomb | June 7, 1892 |
| 632,915 | Comfort | Sept. 12, 1899 |
| 684,142 | Ward | Oct. 8, 1901 |
| 688,457 | Berger | Dec. 10, 1901 |
| 1,310,736 | Blau | July 22, 1919 |
| 1,430,805 | Gilmore | Oct. 3, 1922 |
| 1,452,341 | Jacqemin | Apr. 17, 1923 |
| 1,467,971 | Wyman | Sept. 11, 1923 |
| 1,675,806 | Holden | July 3, 1928 |
| 1,733,001 | Binger | Oct. 22, 1929 |
| 1,740,975 | Eiring | Dec. 24, 1929 |
| 2,234,427 | Cox | Mar. 11, 1941 |
| 2,385,771 | Bogue | Oct. 2, 1945 |

FOREIGN PATENTS

| | | |
|---|---|---|
| 103,662 | Switzerland | Mar. 1, 1924 |
| 891,401 | France | Dec. 11, 1943 |